(12) United States Patent
Jang et al.

(10) Patent No.: US 8,310,547 B2
(45) Date of Patent: Nov. 13, 2012

(54) DEVICE FOR RECOGNIZING MOTION AND METHOD OF RECOGNIZING MOTION USING THE SAME

(75) Inventors: Minsu Jang, Daejeon (KR); Jaehong Kim, Daejeon (KR); Joochan Sohn, Daejeon (KR)

(73) Assignee: Electronics and Telecommunications Research Institue, Daejeon (KR)

( * ) Notice: Subject to any disclaimer, the term of this patent is extended or adjusted under 35 U.S.C. 154(b) by 419 days.

(21) Appl. No.: 12/631,243

(22) Filed: Dec. 4, 2009

(65) Prior Publication Data

US 2010/0141773 A1   Jun. 10, 2010

(30) Foreign Application Priority Data

Dec. 5, 2008   (KR) .................. 10-2008-0123490
Oct. 6, 2009    (KR) .................. 10-2009-0094577

(51) Int. Cl.
    *H04N 5/225*   (2006.01)
(52) U.S. Cl. ....................... 348/169; 382/103

(58) Field of Classification Search ............ 348/169; 382/103
See application file for complete search history.

(56) References Cited

U.S. PATENT DOCUMENTS

| 6,571,193 | B1 * | 5/2003 | Unuma et al. ............ 702/189 |
| 7,843,425 | B2 * | 11/2010 | Lu et al. .................. 345/156 |
| 2008/0285807 | A1 * | 11/2008 | Lee et al. ................. 382/107 |
| 2009/0070060 | A1 * | 3/2009 | Bang et al. ............... 702/96 |
| 2010/0027845 | A1 * | 2/2010 | Kim et al. ................ 382/107 |
| 2010/0046796 | A1 * | 2/2010 | Pietquin .................. 382/103 |

FOREIGN PATENT DOCUMENTS

| JP | 2004-157850 | 6/2004 |
| KR | 10-0630806 | 9/2006 |

\* cited by examiner

*Primary Examiner* — Philip B Tran
(74) *Attorney, Agent, or Firm* — Staas & Halsey LLP

(57) ABSTRACT

The present invention provides a device for recognizing a motion. The device for recognizing a motion includes: an input device that includes a light source and an inertial sensor; and a motion recognition mechanism that extracts the trajectory of a user's motion by detecting position change of the light source for a user's motion section that is determined in response to a sensing signal of the inertial sensor.

12 Claims, 4 Drawing Sheets

DEVICE FOR RECOGNIZING MOTION AND METHOD OF RECOGNIZING MOTION USING THE SAME

RELATED APPLICATIONS

The present application claims priority to Korean Patent Application Serial Number 10-2008-0123490, filed on Dec. 5, 2008 and Korean Patent Application Serial Number 10-2009-0094577, filed on Oct. 6, 2009, the entirety of which are hereby incorporated by reference.

BACKGROUND OF THE INVENTION

1. Field of the Invention

The present invention relates to a technology for recognizing a user's motion, in detail, a device for recognizing a motion equipped with a light source and an inertial sensor and a method of recognizing a motion using the device.

2. Description of the Related Art

A method of inputting motion using a camera is a method of recognizing a motion by photographing user's motion as continuous images and recognizing the objects in the images and then capturing movement of the objects in the continuous images. This method is definitely limited in terms of free movement and recognition rate due to a technical limit of image recognition. In particular, it is difficult to practically apply the method due to the small recognition rate by the lighting states and the complexity of the background.

In recent years, a technology that detects the motion trajectory by an infrared light source chasing method, using an infrared camera, and recognizes the motion on the basis of the detection has been proposed. This method makes it possible to relatively accurately measure the motion trajectory, by using a simple and inexpensive device configuration, such that it is advantageous for inputting a motion. In particular, since the movement generated by a motion is directly traced as a trajectory, the method has a large advantage in that the functional difference is not large for users, different from the inertia data.

According to the light source chasing method in the related art, a user wears a light source or move it in his/her hand, a camera measures the trajectory while chasing the movement of the light source, a data process system recognizes a movement pattern generated by the trajectory, thereby recognizing the user's motion.

However, according to the light source chasing method in the related art, it is difficult to discriminate the user's motions. For example, when the light source continuously emits light, the trajectory of the user's motion is measured as a continuous line, which does not stop, such that it is difficult to automatically find where the motion is finished in the trajectory.

In order to overcome the problem, the related art controls a light source to emit light during a motion, using a switch, such as a button, to discriminate the user's motion by artificially making stops in the trajectory. However, although this method makes it possible to discriminate the user's motion, it prevents the user from concentrating on a motion, such that inputting motion is inconvenient. In particular, when the frequency of inputting motion is high, inconvenience is increased and accuracy of inputting the motion may be reduced.

SUMMARY OF THE INVENTION

The present invention addresses the problem described above and it is an object of the invention to provide a device for recognizing a motion which has high accuracy in recognition of a user's motion.

It is another object of the present invention is to provide a method of recognizing a user's motion, using the device for recognizing a motion.

In order to achieve the objects of the present invention, a device for recognizing a motion according to an embodiment of the present invention includes: an input device that includes a light source and an inertial sensor; and a motion recognition mechanism that extracts the trajectory of a user's motion by detecting position change of the light source for a user's motion section that is determined in response to a sensing signal of the inertial sensor.

In order to achieve the objects of the present invention, a method of recognizing a motion according to another embodiment of the present invention includes: determining a user's motion section in response to a sensing signal outputted from an inertial sensor; and extracting the trajectory of a user's motion by detecting positional changes of a light source in accordance with the determination result of the user's motion section.

BRIEF DESCRIPTION OF THE DRAWING

Brief description of the drawing is provided to help understand the accompanying drawings referred in the following detailed description.

DETAILED DESCRIPTION OF THE PREFERRED EMBODIMENTS

The accompanying drawings exemplifying embodiments of the present invention and the description in the accompanying drawings should be referred to sufficiently understand the present invention, advantages in the operation of the present invention, and the objects that will be achieved by the embodiments of the present invention.

The prevent invention is described in detail by describing preferable embodiments of the present invention with reference to the accompanying drawings.

Figure 1:
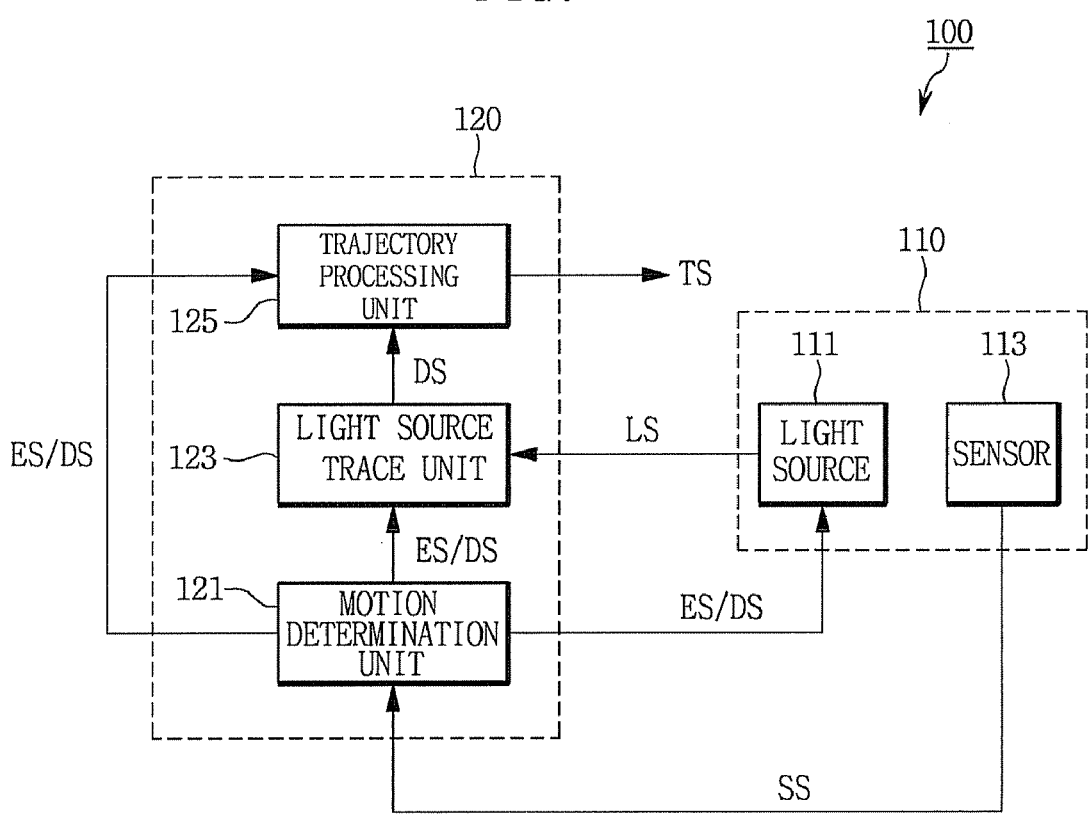
FIG. 1 is a schematic block diagram of a device for recognizing a motion according to an embodiment of the present invention.
Figure 2:
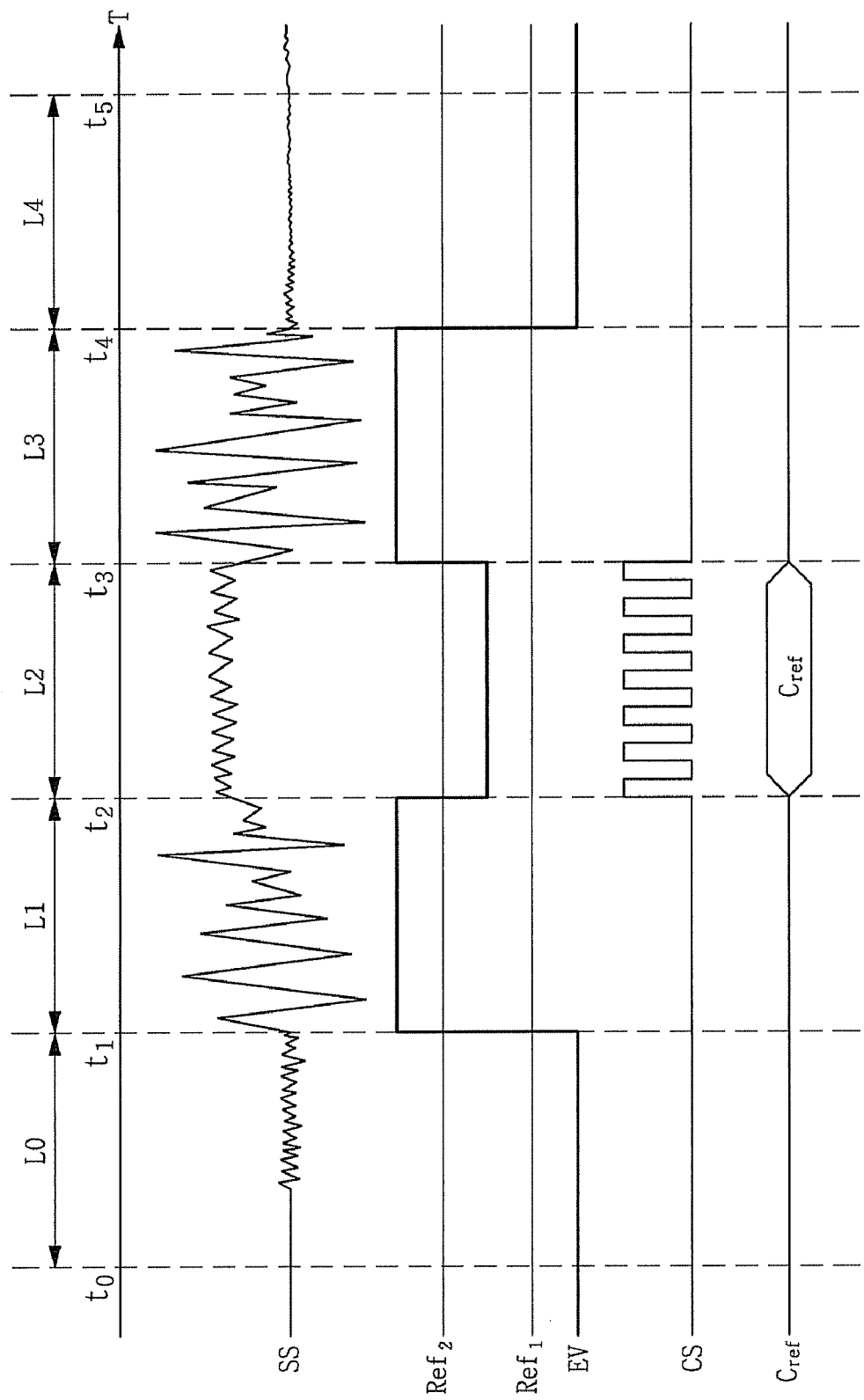
FIG. 2 is a view illustrating a signal waveform in response to sensing of a sensor and corresponding determination of a user's motion shown in FIG. 1.

FIG. 1 is a schematic block diagram of a device for recognizing a motion according to an embodiment of the present invention and FIG. 2 is a view illustrating a signal waveform in response to sensing of a sensor and corresponding determination of a user's motion shown in FIG. 1.

Referring to FIG. 1, a device for recognizing a motion 100 according to the present embodiment may include an input device 110 and a motion recognition mechanism 120.

The input device 110 includes a light source 111, which generates a visual signal, such as light LS, and a sensor 113 that senses movement of a user, and the user may wear or have the input unit.

The sensor 113 may be an inertial sensor that senses changes in inertial force by the user's movement and outputs a sensing signal SS, or for example, may be an acceleration sensor, an angular rate sensor, an inclination sensor, a gravity sensor, a geomagnetic sensor, and a gyro sensor.

The motion recognition mechanism 120 may include a motion determination unit 121, a light source trace unit 123, and a trajectory processing unit 125.

The motion determination unit 121 can determine the states of a user's motion in response to the sensing signal SS outputted from the sensor 113 of the input unit 110 and determine user's motion sections in accordance with the states.

The motion determination unit 121 can outputs a control signal for controlling the operation of at least one of the light source 111, light source trace unit 123, and trajectory processing unit 125, on the basis of the determination result. The control signal may be an enable/disable signal DE/DS.

According to an embodiment, the motion determination unit 121 outputs an enable/disable signal ES/DS according to the result of determining the state of user's to the light source 111 and the light source 111 can be turned on/off in response to the enable/disable signal ES/DS.

According to another embodiment, the motion determination unit 121 outputs an enable/disable signal ES/DS according to the result of determining the state of the user's motion to the light source trace unit 123 and the light source trace unit 123 may be activated or not in response to the enable/disable signal ES/DS. The light source trace unit 123 can trace and detect the position of the light source 111 in response to the enable signal ES of the motion determination unit 121.

According to another embodiment, the motion determination unit 121 outputs an enable/disable signal ES/DS according to the result of determining the state of the user's motion to the trajectory processing unit 125 and the trajectory processing unit 125 may be activated or not in response to the enable/disable signal ES/DS. The trajectory processing unit 125 can extract and output the motion trajectory TS of the user on the basis of the light source position signal PS outputted from the light source trace unit 123, in response to the enable signal ES of the motion determination unit 121. The device for recognizing a motion 100 can recognize the user's motion on the basis of the motion trajectory TS outputted from the trajectory processing unit 125.

Although it is exemplified in the present embodiment that the motion determination unit 121 is included in the motion recognition mechanism 120, the present invention is not limited thereto. For example, according to a variety of embodiments of the device for recognizing a motion 100, the motion determination unit 121 may be included in the input device 110 or individually configured. When the motion determination unit 121 is included in the input device 110, it may be preferable for the light source 111 to be turned on/off in accordance with the determination result of the motion determination unit 121.

Referring to FIGS. 1 and 2, the motion determination unit 121 analyzes the sensing signal SS outputted from the input device 110 and can determine the state of the user's motion and the corresponding user's motion section on the basis of the analyzed result.

According to an embodiment, the sensing signal SS may be an acceleration signal that changes in accordance with the user's motion, and accordingly, the sensor 113 of the input device 110 may be a 3-axis acceleration sensor. The 3-axis acceleration sensor can sense an acceleration signal that changes in x-, y-, and z-axes in accordance with the user's motion and output a sensing signal SS.

The motion determination unit 121 can be provide with sensing signals SS from the sensor 113 for the times t0 to t5 on the time axis T.

The motion determination unit 121 can covert the sensing signal SS into the varied amount of energy EV. For example, the motion determination unit 121 calculates motion energy values of the sensing signals SS by calculating the standard deviation of the sensing signals SS for a plurality of time sections (L0 to L4), and can calculates the varied amount of energy EV to the sensing signals SS for the plurality of time sections (L0 to L4) by calculating the standard deviation of the motion energy values calculated.

The calculated varied amount of energy EV can be compared with a plurality of reference levels Ref1 and Ref2, respectively, and according to the compared result, the state of the user's motion and the corresponding user's motion sections can be determined.

For example, as in the times t0 to t1 and t4 to t5 on the time axis T, when the calculated varied amount of energy EV is smaller than the first reference level Ref1, the motion determination unit 121 can determine that the user's motion is finished.

Further, as in the times t2 to t3 on the time axis T, when the calculated varied amount of energy EV is larger than the first reference level Ref 1 or the same within a tolerance, and smaller than the second reference level Ref2, the motion determination unit 121 can determine that the user's motion is in a motion-waiting state.

In this operation, the motion determination unit 121 can perform counting for the times t2 to t3 on the time axis T. The motion determination unit 121 can compare the counting value CS resulting from the counting operation with a third reference level, that is, a reference counting level Cref. The motion determination unit 121 can determine that the state of the user's motion has changed from the motion-waiting state to a motion end state, in accordance with the compared result. For this operation, the motion determination unit 121 may further include a counter (not shown).

As in the times t1 to t2 and t3 to t4 on the time axis T, when the varied amount of energy EV is larger than the second reference level Ref2 or the same within a tolerance, the motion determination unit 121 can determine that the state of the user's motion is a start state.

The motion determination unit 121 can output an enable/disable signal ES/DS that allows for controlling the operation of at least one of the light source 111, light source trace unit 123, and trajectory processing unit 125.

Referring to FIG. 1 again, the light source trace unit 123 traces and detects position changes of the light source 111, for example, position changes of the light emitted from the light source 111, on the basis of the result determined by the motion determination unit 121, and then can output a light source position signal PS according to the detected result.

The trajectory processing unit 125 can extract the trajectory TS of the user's motion on the basis of the light source position signal PS outputted from the light source trace unit 123 and can recognize the user's motion on the basis of the extracted trajectory TS of the user's motion.

Figure 3:
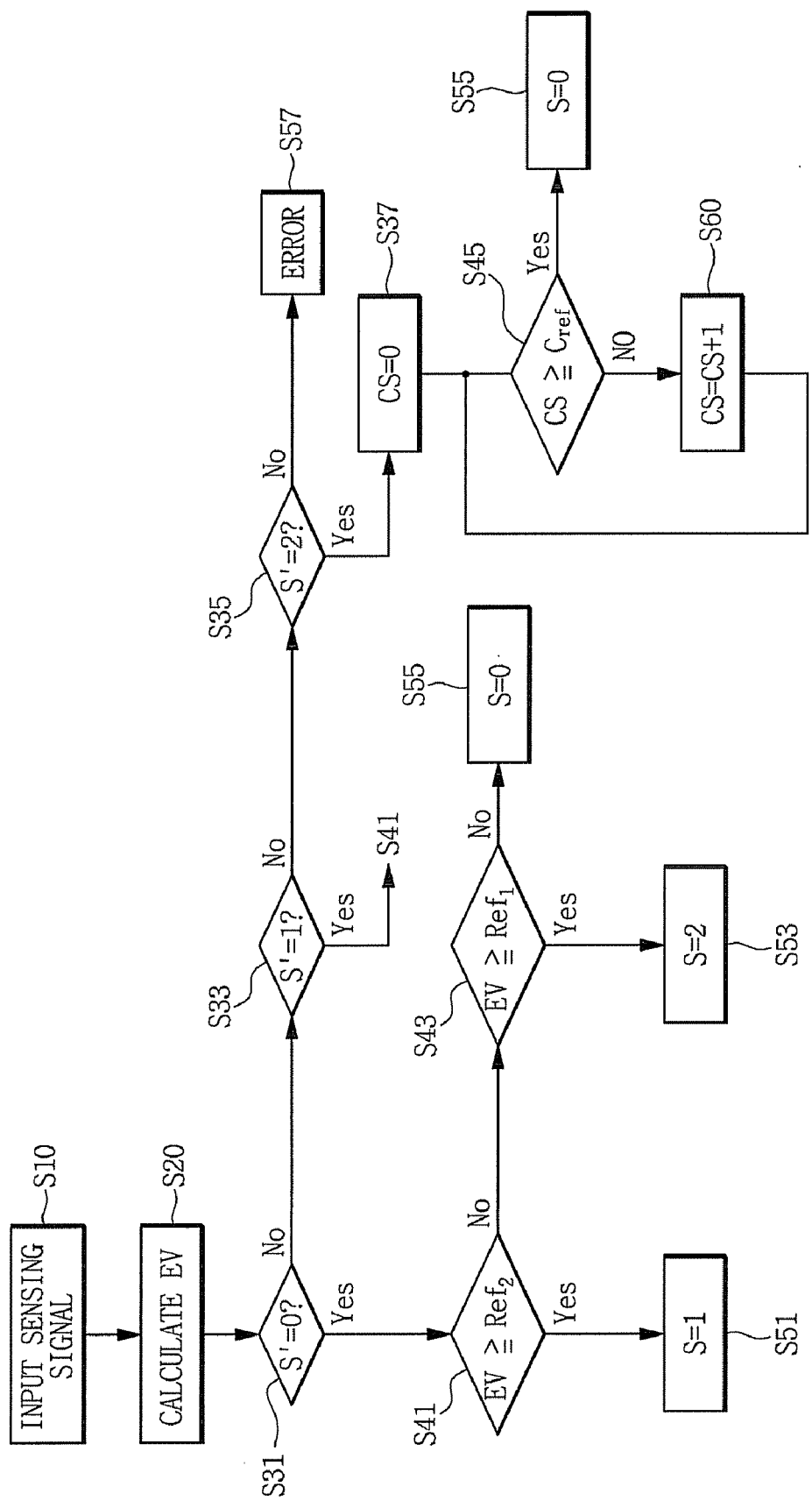
FIG. 3 is a motion recognition flowchart in accordance with the operation of the device for recognizing a motion shown in FIG. 1.

FIG. 3 is a motion recognition flowchart in accordance with the operation of the device for recognizing a motion shown in FIG. 1. In the present embodiment, "S'" and "S" indicate the state of the user's motion, "EV" indicates the varied amount of energy, "Ref1" indicates the first reference level, "Ref2" indicates the second reference level, "Cref" indicates the reference counting level, and "CS" indicates the counting value.

Referring to FIGS. 1 to 3, when a user wearing or having the input device 110 makes a predetermined movement, the sensor 113 of the input device 110 outputs a sensing signal SS corresponding to the user's movement. The sensing signal SS is inputted into the motion determination unit 121 (S10).

The motion determination unit 121 calculates the varied amount of energy EV from the sensing signal SS (S20). For example, the motion determination unit 121 obtains motion energy values from the sensing signals SS for the plurality of sections L0 to L4 and can calculate the varied amount of energy EV for each section by calculating the standard deviation of the motion energy values.

Next, the state S' of a user's motion defined in advance is determined in S31, S33, and S35, and the calculated varied amount of energy EV can be compared with at least one of the reference levels Ref1 and Ref2 (S41 and S43).

When the state S' of a user's motion defined in advance corresponds to the motion end state (S'=0) (S31), the motion determination unit 121 can compare the varied amount of energy EV with the second reference level Ref2 (S41).

As a result of the comparison, when the varied amount of energy EV is larger than the second reference level Ref2 or the same within a tolerance, the motion determination unit 121 can determine that the present user's motion state S is the motion start state (S=1) (S51).

However, when the varied amount of energy EV is smaller than the second reference level Ref2, the motion determination unit 121 can compare the varied amount of energy EV with the first reference level Ref1 (S43).

As a result of the comparison, when the varied amount of energy EV is larger than the first reference level Ref1 or the same within a tolerance, the motion determination unit 121 can determine that the state S of the user's motion is a motion-waiting state (S=2) (S53).

However, when the varied amount of energy EV is smaller than the first reference level Ref1, the motion determination unit 121 can determine that the state S of the user's motion is the motion end state (S=0) (S55).

After determining the present state S of a motion of the user, the motion determination unit 121 controls the operation of at least one of the light source 111, light source trace unit 123, and the trajectory processing unit 125, and receives a sensing signal SS again from the sensor 113 (S10).

When the state S' of a user's motion defined in advance is the motion start state (S'=1), not the motion end state (S'=0) (S33), the motion determination unit 121 can start with the step S41 of comparing the varied amount of energy EV with the second reference level Ref2.

When the state S' of a user's motion defined in advance is the motion-waiting state (S'=2), not the motion start state (S'=1) or the motion end state (S'=0) (S35), the motion determination unit 121 initialize the counting value CS to 0 (S37) and performs counting for the motion waiting time. Thereafter, it can compare the counting value CS with the reference counting level Cref (S45).

As a result of the comparison, when the counting value CS is larger than the reference counting level Cref or the same within a tolerance, the motion determination unit 121 can determine that the present state S of the user's motion is the motion end state (S=0) (S55). After the present state S of user's motion is determined, it can perform step S10 of receiving a sensing signal SS from the sensor 113.

However, when the counting value CS is smaller than the reference counting value Cref, the motion determination unit 121 can compare the counting value CS with the reference counting level Cref (S45) while gradually increasing the counting value CS (S60). In accordance with the compared result, the motion determination unit 121 can determine that the present state S of the user's motion (S55), or can perform the step (S45) of comparing the counting value CS with the reference counting level Cref again by increasing the counting value CS.

On the other hand, when the state S' of a user's motion defined in advance is not the motion end state (S'=0), the motion start state (S'=1), and the motion-waiting state (S'=2), the device for recognizing a motion 100 can output an error message (S57).

Figure 4:
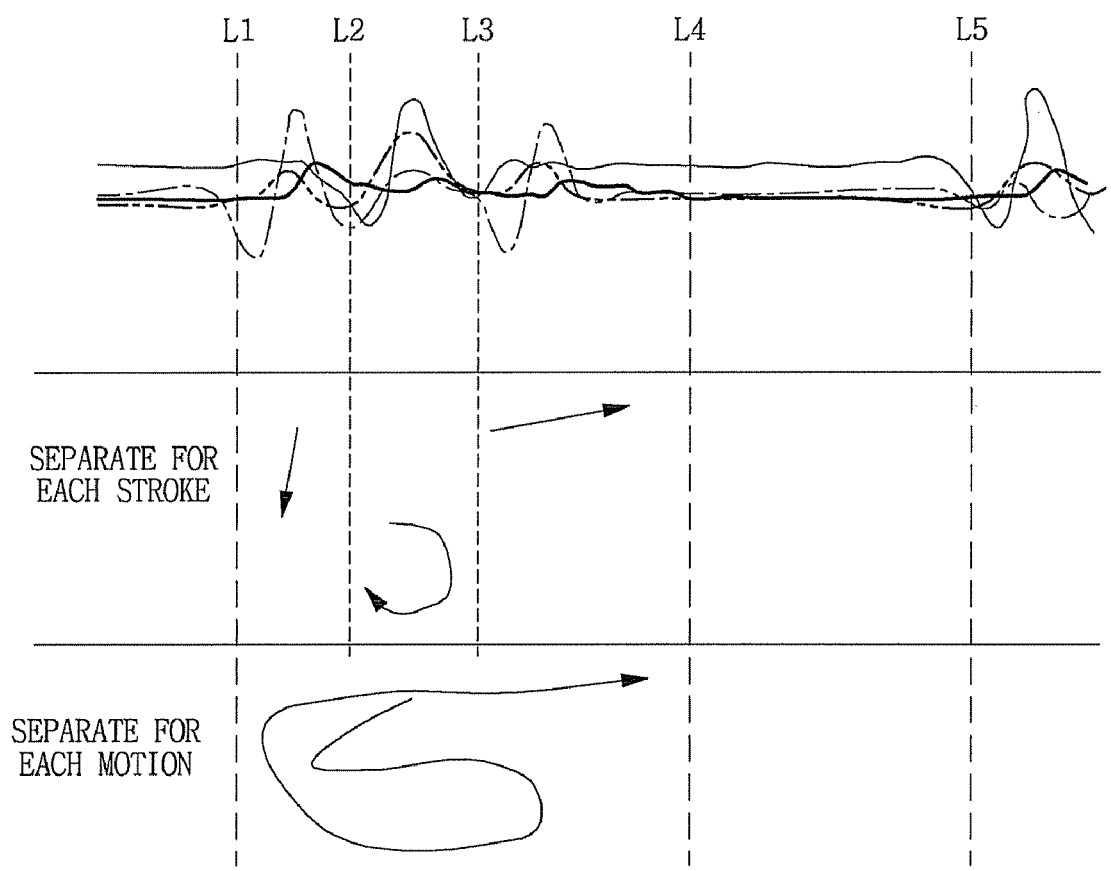
FIG. 4 is a view showing an embodiment of recognizing a user's motion by the device for recognizing a motion shown in FIG. 1.

FIG. 4 is a view showing an embodiment of recognizing a user's motion by the device for recognizing a motion shown in FIG. 1.

Referring to FIGS. 1 to 4, the motion determination unit 121 calculates the varied amount of energy EV for the plurality of sections L1 to L5, and can determine the state of the user's motion by comparing the calculated varied amount of energy EV with the reference levels Ref1 and Ref2, respectively.

In this operation, the motion determination unit 121 can adjust the determination reference of the user's motion section by adjusting the magnitude of the critical values of the plurality of reference levels Ref1 and Ref2.

As shown in FIG. 4, if a user makes a motion for writing a number 5 in a three-dimensional space, the motion determination unit 121 can separately determine the state of the user's motion for each stroke or each motion, in accordance with the magnitude of the critical values of the plurality of reference levels Ref1 and Ref2.

In this case, the motion stop section between strokes in separating for each stroke is smaller than the motion stop section between the motions in separating for each motion. Accordingly, in order to separate the state of the user's motion for each stroke, the motion determination unit 121 can adjust the critical values of the plurality of reference levels Ref1 and Ref2 smaller than when separating the critical values for each motion.

The motion determination unit 121 can determine that the state of the user's motion is the motion start state for the first section L1 to the fourth section L4 of the sensing signal SS and the light source trace unit 123 can detect a light source position signal PS according to movement of the user. The trajectory processing unit 125 can extract a trajectory TS of the user's motion on the basis of the light source position signal PS.

The device for recognizing a motion 100 can recognize a user's motion, for example, the operation for writing a number 5, on the basis of the trajectory TS of the user's motion which has been outputted from the trajectory trace unit 125.

Meanwhile, the motion determination unit 121 can determine that the state of the user's motion is the motion-waiting state for from the fourth section L4 to the fifth section L5 of the sensing signal SS. In this operation, the motion determination unit 121 compares the counting value CS obtained by counting the motion-waiting state time with the reference counting value Cref and then can determine that the state of the user's motion is the motion end state, in accordance with the comparison result.

When it is determined that the state of the user's motion is the motion-waiting state or the motion end state by the motion determination unit 121, at least one of the light source 111, light source trace unit 123, and trajectory processing unit 125 may be disabled by a disable signal DS outputted from the motion determination unit 121.

The motion determination unit 121 can determine the state of the user's motion again in response to a sensing signal SS that is outputted from the sensor 113 in accordance with the user's next motion.

Although, the embodiments of the present invention were described above with reference to the accompanying drawings, the present invention is not limited to the embodiment and the drawings described disclosed herein and may be modified without departing from the scope of the present invention.

What is claimed is:

1. A device for recognizing a motion, comprising:
an input device that includes a light source and an inertial sensor;
a motion recognition mechanism that extracts a trajectory of a user's motion by detecting position change of the light source for a user's motion section that is determined in response to a sensing signal of the inertial sensor; and
a motion determination unit that calculates the varied amount of energy in response to the sensing signal, and determines the user's motion section in accordance with the state of the user's motion by comparing the calculated varied amount of energy with at least one reference level,
wherein the at least one of reference level includes a first reference level and a second reference level, and
wherein the motion determination unit determines that the user's motion is a motion start state when the varied amount of energy is the same or more than the second reference level, and determines that the state of the user's motion is one of a motion-waiting state and a motion end state when the varied amount of energy is smaller than the second reference level.

2. The device for recognizing a motion according to claim 1, the motion determination unit determines that the state of the user's motion is the motion-waiting state when the varied amount of energy is the same or larger than the first reference level and smaller than the second reference level, and determines that the state of the user's motion is the motion end state when the varied amount of energy is smaller than the first reference level.

3. The device for recognizing a motion according to claim 1, wherein the motion determination unit further includes a counter that performs counting for a motion-waiting time after determining that the state of the user's motion is the motion-waiting state, and
wherein the motion determination unit determines that the state of the user's motion has changed from the motion-waiting state to the motion end state when a counting value of the counter is the same or larger than a reference counting level.

4. The device for recognizing a motion according to claim 1, wherein the motion determination unit separately determines the state of the user's motion for each stroke or for each motion by adjusting a critical value of at least one reference level.

5. The device for recognizing a motion according to claim 4, wherein the motion determination unit adjusts the critical value of separating the state of the user's motion for each stroke, to be smaller than the critical value of separating the state of the user's motion for each motion.

6. The device for recognizing a motion according to claim 1, wherein the input device further includes a motion determination unit that calculates the varied amount of energy in response to the sensing signal and determines a user's motion section in accordance with the calculated varied amount of energy, and
wherein the light source is controlled to be turned on/off in accordance with the determination result of the motion determination unit, and the motion recognition mechanism extracts the trajectory of the user's motion by detecting position change of the light source, when the light source is turned on.

7. The device for recognizing a motion according to claim 1,
wherein the motion determination unit calculates the varied amount of energy in response to the sensing signal and determines a user's motion section in accordance with the calculated varied amount of energy, and
wherein the motion recognition mechanism includes:
a light source trace unit that detects position changes of the light source in accordance with the determination result; and
a trajectory processing unit that extracts the trajectory of the user's motion in accordance with the detection result, and
wherein one of the light source trace unit and the trajectory processing unit is enabled or disabled in accordance with determination result of the motion determination unit.

8. A method of recognizing a motion, comprising:
determining a user's motion section in response to a sensing signal outputted from an inertial sensor; and
extracting the trajectory of a user's motion by detecting positional changes of a light source in accordance with the result of the determining,
wherein the determining of the user's motion section includes:
calculating the varied amount of energy in response to the sensing signal;
comparing the calculated varied amount of energy with at least one of reference levels, and
determining a state of the user's motion in accordance with the comparison result, and
wherein the at least one reference level includes a first reference level and a second reference level, and
wherein the determining the state of the user's motion in accordance with the comparison result determines that the state of the user's motion is a motion start state when the varied amount of energy is the same or larger than the second reference level, and determines that the state of the user's motion is a motion-waiting state or a motion end state when the varied amount of energy is smaller than the second reference level.

9. The method of recognizing a motion according to claim 8, wherein the determining of the user' motion state in accordance with the comparison result further includes
determining that the state of the user's motion is the motion-waiting state when the varied amount of energy is the same or larger than the first reference level and smaller than the second reference level, and
determining that the state of the user's motion is the motion end state when the varied amount of energy is smaller than the first reference level.

10. The method of recognizing a motion according to claim 8, wherein the determining of the state of the user's motion in accordance with the comparison result further includes:
counting for a motion-waiting time after determining that the state of the user's motion is the motion-waiting state;
comparing a counting value with a reference counting level; and
determining that the state of the user's motion has changed from the motion-waiting state to the motion end state when the counting value is the same or larger than the reference counting value.

11. The method of recognizing a motion according to claim 8, wherein the determining of the user's motion section further includes
adjusting a critical value of at least one reference level, and wherein the determining of the state of the user's motion in accordance with the comparison result is performed by separately determining the state of the user's motion for each stroke or each motion in accordance with at least one reference level with the critical value adjusted.

12. The method of recognizing a motion according to claim 11, wherein the adjusting of the critical value of at least one reference level is performed by adjusting the critical value in the case of separating the state of the user's motion for each stroke to be smaller than the critical value in the case of separating the state of the user's motion for each motion.

\* \* \* \* \*